US011587019B2

(12) United States Patent
Pashov et al.

(10) Patent No.: US 11,587,019 B2
(45) Date of Patent: Feb. 21, 2023

(54) METHOD FOR A REGISTRATION OF USAGE OF TRACKING DATA

(71) Applicant: SIEMENS AKTIENGESELLSCHAFT, Munich (DE)

(72) Inventors: Ilian Pashov, Constance (DE); Oliver Stroebel, Frankfurt am Main (DE); Michael Zettler, Allensbach (DE)

(73) Assignee: Siemens Aktiengesellschaft, Munich (DE)

(*) Notice: Subject to any disclaimer, the term of this patent is extended or adjusted under 35 U.S.C. 154(b) by 218 days.

(21) Appl. No.: 16/971,991

(22) PCT Filed: Dec. 18, 2018

(86) PCT No.: PCT/EP2018/085462
§ 371 (c)(1),
(2) Date: Aug. 21, 2020

(87) PCT Pub. No.: WO2019/166119
PCT Pub. Date: Sep. 6, 2019

(65) Prior Publication Data
US 2021/0035061 A1 Feb. 4, 2021

(30) Foreign Application Priority Data
Feb. 27, 2018 (EP) .................................... 18158920

(51) Int. Cl.
*G06Q 10/08* (2012.01)
*G06Q 50/30* (2012.01)
(Continued)

(52) U.S. Cl.
CPC ..... *G06Q 10/0833* (2013.01); *G06F 16/1837* (2019.01); *G06Q 50/30* (2013.01); *H04L 9/0618* (2013.01); *H04L 9/50* (2022.05)

(58) Field of Classification Search
CPC ................ G06Q 10/0833; G06Q 50/30; G06F 16/1837; H04L 9/50; H04L 9/0618
(Continued)

(56) References Cited

U.S. PATENT DOCUMENTS 6,476,718 B1 11/2002 Cartwright et al.
9,398,795 B2 7/2016 Gupta et al.
(Continued)

FOREIGN PATENT DOCUMENTS

EP 3096279 A1 11/2016
WO 2013017179 A1 2/2013
(Continued)

OTHER PUBLICATIONS

Álvarez-Díaz,Néstor; Herrera-Joancomarti, Jordi; and Caballero-Gil. Pino. Smart contracts based on blockchain for logistics management. In Proceedings of the 1st International Conference on Internet of Things and Machine Learning (IML '17). https://dl.acm.org/doi/pdf/10.1145/3109761.3158384 (Year: 2017).*
(Continued)

*Primary Examiner* — Shannon S Campbell
*Assistant Examiner* — Lisa Ma
(74) *Attorney, Agent, or Firm* — Laurence A. Greenberg; Werner H. Stemer; Ralph E. Locher

(57) ABSTRACT

A computer implemented method allows the storage of tracked data records in a blockchain in order to incentivize airlines, ground handlers, IT Suppliers and airports to invest in tracking points for tracking baggage. The usage of tracking data records is determined by a smart contract. The smart contract causes a specific entry in a wallet and each entry represents the usage of tracking data records.

9 Claims, 3 Drawing Sheets

(51) Int. Cl.
*H04L 9/00* (2022.01)
*G06Q 10/0833* (2023.01)
*G06F 16/182* (2019.01)
*H04L 9/06* (2006.01)

(58) Field of Classification Search
USPC .......................................................... 705/333
See application file for complete search history.

(56) References Cited

U.S. PATENT DOCUMENTS

| | | | |
|---|---|---|---|
| 10,891,613 B1* | 1/2021 | Schindler | G06Q 20/3678 |
| 2003/0100973 A1* | 5/2003 | Quackenbush | G06Q 10/02 |
| | | | 700/226 |
| 2009/0091452 A1 | 4/2009 | Himmel | |
| 2013/0234849 A1* | 9/2013 | Gupta | G06Q 10/0833 |
| | | | 340/539.11 |
| 2014/0188523 A1 | 7/2014 | Levine et al. | |
| 2016/0342982 A1 | 11/2016 | Thomas et al. | |
| 2017/0048209 A1 | 2/2017 | Lohe et al. | |
| 2017/0230189 A1 | 8/2017 | Toll et al. | |
| 2017/0372300 A1 | 12/2017 | Dunlevy et al. | |
| 2018/0096175 A1* | 4/2018 | Schmeling | G06F 1/3206 |
| 2018/0367454 A1* | 12/2018 | Salamoun | H04L 45/74 |
| 2019/0199518 A1* | 6/2019 | Rady | H04L 9/3278 |
| 2021/0144149 A1* | 5/2021 | Simons | G06N 20/00 |

FOREIGN PATENT DOCUMENTS

| | | | | |
|---|---|---|---|---|
| WO | 2017007806 A1 | 1/2017 | | |
| WO | 2017165909 A1 | 10/2017 | | |
| WO | WO-2018213804 A2 * | 11/2018 | ........... | G06Q 10/087 |

OTHER PUBLICATIONS

Neisse, Ricardo; Steri, Gary; and Nai-Fovino, Igor. 2017. A Blockchain-based Approach for Data Accountability and Provenance Tracking. https://dl.acm.org/doi/pdf/10.1145/3098954.3098958 (Year: 2017).*
Baggage Tracking IATA Resolution 753/A4A Resolution 30.53 / International Air Transport Association; 2017.
Cheng Steve: "Using blockchain to improve data management in the public sector: McKinsey & Company", XP055552825, Retrieved from the Internet: URL:https://web.archive.org/web/20170301043107/http://www.mckinsey.com/business-functions/digital-mckinsey/our-insights/using-blockchain-to-improve-data-management-in-the-public-sector, [retrieved on Feb. 6, 2019], pp. 3-7; 2017.
Roy Manuelli: "Blockchain: The smart, secure and seamless future of air travel for all", XP055552778, Retrieved from the Internet: URL:https://www.internationalairportreview.com/article/34739/blockchain-sita-it-summit-2017/ [retrieved on Feb. 6, 2019], pp. 2-4; 2017.
What's a blockchain oracle? Information oracles & external data feeds; 2018.
Bashir Imran: "Mastering Blockchain", In: "Mastering Blockchain", Packt Publishing, XP055393678, ISBN: 978-1-78712-544-5, chapter 6-7, pp. 22, 105-107, 268, 439-140, 453; pp. 198-206; 2017.
Recommended Practice 1800, Automated Baggage Handling Based on the IATA Licence Plate Concept, PSC(34)1800.
Recommended Practice 1745, Baggage Information Messages Autor: IATA (ein Kollektiv), Literaturstelle: www.iata.org; 2016.
Blockchain: The smart, secure and seamless future of air travel for all; Kevin O'Sullivan; 2017.
Neisse Ricardo: "A Blockchain-based Approach for Data Accountability and Provenance Tracking", Availability, Reliability and Security, pp. 1-10, XP055552807, 2 Penn Plaza, Suite 701NewYorkNY10121-0701USA DOI: 10.1145/3098954. 3098958; ISBN: 978-1-4503-5257-4, pp. 1-8; 2017.

* cited by examiner

METHOD FOR A REGISTRATION OF USAGE OF TRACKING DATA

BACKGROUND OF THE INVENTION

Field of the Invention

The present invention relates to a computer implemented method for a registration of usage of tracking data records of passenger baggage in which bag items for transportation from an airport of departure to a destination airport are tracked at a plurality of points with data identifying the bag item, data identifying a point on which a bag item is tracked, and data representing a time stamp of the passing of a bag item at a tracking point, and in which the identity of a bag item, the identity of a tracking point and the data representing a time stamp of the passing of a bag item are stored in a tracking data record.

Airports are always under pressure while preparing large passenger aircrafts such as A380 for departure. Typically, the airlines use such aircraft to serve long haul flights between large connection hubs. The nature of such flights means a priori dependency on many connecting flights and also a large number of transfer baggage that have to be loaded into an aircraft. Any abnormal event at the airport, such as for example delay of an inbound connecting flight could disturb the aircraft preparation process and lead to mishandling of baggage. There are mainly two events that are very likely to happen on a baggage journey:
  delay of connecting flights,
  mechanical outages.

These two events—among others—have to be considered as quite regular.

Mechanical outages in the baggage handling systems are not unusual. Due to the large amount of mechanical components and equipment that are built into such systems, the probability that a component in the system will fail is high. Even with a preventive maintenance of baggage handling systems and with a permanent availability of repair teams the likelihood of mechanical outages remains relatively high.

In case of a delay of a connecting flight the problem can be reduced with organizational measures as e.g. a special baggage processing with a direct gate to gate transfer. This solution bears however, a certain risk of some lost luggage. In the meaning of this document, no distinction is made between luggage and baggage, therefor the terms baggage and bag items will be used synonymic.

The situation for passengers at a destination airport is unsatisfying, since even with a support of service desks like a lost luggage desk, there is no possibility for a seamless baggage tracking, since the chain of tracking baggage has some gaps due to different responsibilities of normally four different types of organizations in charge with baggage handling:
  Airports,
  airlines,
  ground handlers,
  IT-suppliers.

Later-on these organizations will be called "parties". Airlines are able to state if and when a baggage piece was at an airport, but only in few cases if and when a baggage item was loaded into a specific aircraft and respectively unloaded from an aircraft.

On overview of a typical baggage journey is depicted in FIG. 1. Without giving a lot of details, this FIG. 1 illustrates rather clearly that a considerable effort has to be made for tracking a bag item from a starting airport A via a transfer airport B to a destination airport C. FIG. 1 will be explained in more details later on in this document.

In order to solve the before mentioned problem the International Air Transport Association IATA has issued a document with the title
  «Baggage Tracking IATA Resolution 753/A4A Resolution 30.53 Implementation Guide» [1].

This Resolution is denoted in short as «IATA 753/A4A».
In «IATA 753/A4A» the term «tracking data» is used for «baggage tracking data» containing an identity of a bag item and information when and where this bag item passed a specific point at a baggage journey. This term «tracking data» will be used subsequently in this document.

For sharing baggage tracking data there are the Baggage Messages defined by IATA RP 1745 [3], which provide messaging structures that are exchanged by systems to handle baggage. Typically, the baggage messages are distributed between systems and airports throughout messaging gateways as for example the «SITA BagMessage System». Baggage messages do generally not provide direct information about baggage tracking points inside an airport and the scanning time. Such information can be indirectly derived provided some conditions are met.

The document «IATA 753/A4A» helps to improve the situation in a technical sense. But for operational reasons «IATA 753/A4A» does not help a lot, since the before mentioned four types of organization have different or even competing interests.

Considering this situation and in order to reach a possible technical solution reference is made to a document with the title
  «Blockchain: The smart, secure and seamless future of air travel for all» [2].

The content of this document [2] is under consideration of the before mentioned prerequisites summarized as follows:
  «In order to evaluate tracking data originating from the before mentioned four categories of organizations the trust into this tracking data is a key factor, since this evaluation is based on a sharing process of this tracking data. With the Blockchain technology a validation of collaboration between the aforementioned categories of organizations is assured.

The Blockchain technology brings a distribution mechanism that ensures that all involved organizations are looking at updated tracking data in a real-time manner. Probably the best way of doing so might be within a closed community (such as the aviation and airport industry) within which only certain people need to access the relevant tracking data. All digital records on tracking data can be stored with the Blockchain technology including the ownership of this tracking data. Blockchain technology gives all participating organizations the necessary confidence that they are looking at the correct tracking data. If something goes wrong with a bag, via the Blockchain technology an entire journey can be reconstructed in a verified manner.»

Irrespective of the before mentioned availability of tracking data, this tracking data is primarily provided locally at the different points of a baggage journey. Additional baggage tracking is performed only if it is absolutely necessary for determining the baggage identity or the security status of baggage items. The technology for the identification and the tracking of a baggage item is expensive, since it requires high investment costs, as for example in sortation equipment and scanning and tracking devices or high processing costs, e.g. by using hand-held barcode scanning devices. The involved ground organizations as airports and ground handlers are reluctant to collect and share tracking data beyond the service obligations that they have. It is not economically feasible for these organizations to introduce additional tracking points in baggage handling processes, such as e.g. by loading or unloading an aircraft, unless the costs for serving these points are not fully covered by their customers, e.g. the Airlines. As previously mentioned, the current scanning technology for baggage identification requires either significant CAPEX for e.g. sortation equipment and/or increased OPEX for e.g. staff resource for manual scanning.

As stated by IATA in the Resolution IATA 753/A4A collection and availability of baggage tracking is a significant factor to improve the air passenger's experience. On the one hand side, the data will provide transparency, which will ultimately lead to improvements in the baggage handling processes. On the other hand-side, the passengers will become new possibilities, such as the possibility to track the status of their check-in baggage during the journey and/or get early notifications in case of unexpected irregularities and avoid unnecessary additional burdens such as performing time intensive lost-and-found baggage registration. Currently airlines attempt to implement such solutions on their own, which are partially helpful considering the highly distributed nature of the air travel cross multiple countries and airports.

Based on the availability of tracking data of baggage items with the Blockchain technology according to the teachings in document [2] there is a need for a trusted registering of the usage of tracking data. A usage of tracking data incentivizes potential collectors/providers—the aforementioned four types organizations—to invest and to exchange this tracking data and by doing so this usage is a base for a billing process between the involved organizations as well as—under certain restrictions—this billing can be applied also for passengers asking for the status of their baggage.

SUMMARY OF THE INVENTION

The aim of the present invention is to provide a registration of usage of tracking data under the conditions as set out before.

This aim is reached by a computer implemented method for a registration of usage of tracking data records of bag items in the airline industry in which bag items for transportation from an airport of departure to a destination airport are tracked at a plurality of points with data identifying the bag item, data identifying a point on which a bag item is tracked, and data representing a time stamp of the passing of a bag item at a tracking point, in which the identity of a bag item, the identity of a tracking point and the data representing a time stamp of the passing of a bag item are stored in a tracking data record, the tracking data record is received as a transaction by an oracle which checks if a smart contract is available and if so the oracle pushes the transaction into a node of a blockchain, the usage of tracking data records is determined by a smart contract which is interacting with the oracle, the smart contract generates a specific entry in a wallet, and the entry represents the usage of tracking data records.

The invention provides A computer implemented method for a registration of usage of tracking data records comprising the steps:

bag items for transportation from an airport of departure to a destination airport are tracked with means at a plurality of points with data identifying the bag item,
data identifying the means of a point on which a bag item is tracked,
data representing a time stamp of the passing of a bag item at a tracking point;
the identity of a bag item, the identity of a tracking point and the data representing a time stamp of the passing of a bag item being stored in a tracking data record,
the tracking data record is received as a transaction by an oracle, which checks if a smart contract is available and if so the oracle pushes a new transaction into a node of a blockchain;
the usage of tracking data records is determined by the smart contract which is interacting with the oracle,
the smart contract generates a specific entry in a wallet, wherein the entry represents the usage of tracking data records.

By using blockchain technology with smart contract concepts a decentral and trustworthy, a digital business platform is created for commercially exchanging of baggage tracking data that will incentivize potential collectors/sellers/users of tracking data records as the four main players in airline industry:

Airports,
airlines,
ground handlers and
IT-suppliers.

The entries of usage in the wallet allow an automated commercial process among the different organization on the one hand, on the other hand these entries can be used to introduce a virtual identification coin. The identification coin will be used from data providers to get revenue for the identification information that they offer and from the data receivers to revenue the providers for the received tracking data records.

In a preferred embodiment a collaboration platform will provide mechanisms for online exchanging tracked data records against identification coins. The current value of the identification data will be calculated by the platform, using market assessment and trading algorithms and will heavily depend on the actual supply and demand for tracking data.

Any commercial exchange between data providers and receivers of tracking data on the platform will be handled as a «smart contract» and secured with cryptographic algorithms and enforcement code.

By this invention, all of the four types of organizations are incentivized by investing in additional tracking points. Without this invention only tracking points would have been installed which are mandatory, mandatory either by legal or binding operational requirements.

The working principle of the invention will now be described more in detail with reference to the accompanying drawings wherein:

DETAILED DESCRIPTION OF THE INVENTION

Figure 1:
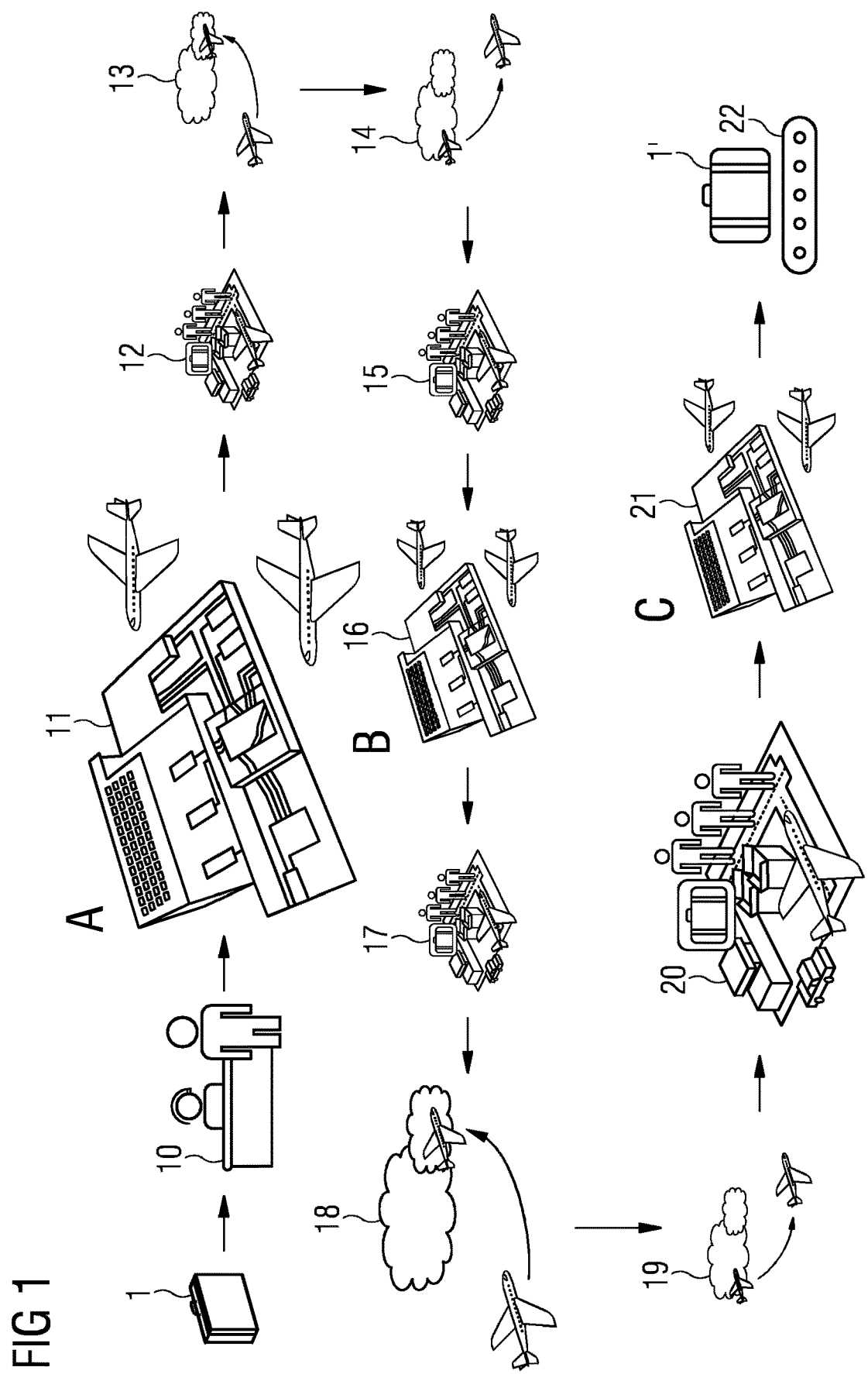
FIG. 1 Baggage journey from a departure airport A via a stopover airport B to an destination airport C.

In order to demonstrate the complexity of a baggage journey reference is made to FIG. 1. A bag item 1 is received by a ground handler or an airline according to the regulation valid at the departure airport A. According to prerequisites of an airline, the bag item 1 is received via bag drop 10 or via check-in 10. The check-in is not necessarily bound to an airport, this can happen, before a passenger arrives at the departure airport A with the so-called «online check-in» via a web-access at home. At the moment of a check-in, an unique identity "bag-id" is assigned to every bag item 1 of the passenger concerned. In this case, the event of the bag drop 10 is tracked at a tracking point of the departure airport A. For this tracking a "track-id" is generated assigned to the bag-id.

The "bag-id" may contain
data identifying a bag item,
data identifying the scheduled flight(s),
data identifying the journey.

The "track-id" may contain
data identifying the tracking point and/or tracking means,
data identifying the airport on which the tracking occurred.

Additionally data "track-t" representing a time stamp of the passing of a bag item 1 at a tracking point is generated.

FIG. 1 depicts the principle of tracking of baggage items. Embodiments of the present invention follow preferably the details of tracking specified by the document After leaving the departure airport A 11, the bag item 1 is delivered to a baggage preparation and aircraft loading location 12 on an aircraft which takes off 13 at the airport of departure A and lands 14 at a transfer airport B.

The aircraft is unloaded 15 at the transfer airport B 16 and undergoes baggage preparation and aircraft loading 17. The aircraft takes off 18 at the transfer airport B and lands 19 at the destination airport C 21 where the bag item 1' undergoes aircraft unloading 20 and is finally available at a baggage claim 22.

IATA Passenger Services Conference Resolutions Manual
Recommended practice 1800 automated baggage handling based on the IATA license plate, [4].

The before mentioned data "bag-id", "track-id" and "track-t" are merged in a tracking data record Tij. In the nomenclature of the blockchain technology this data record Tij is called a transaction Tij. This transaction Tij is stored in a node Ni of a blockchain network K, where i denotes the index of the node in said blockchain and j the index of a transaction in said Node Ni.

The content of the before mentioned tracking data record has to be considered as an example for the background of the invention. A concrete embodiment is preferably realized according to the recommendations given by IATA in the document IATA Passenger Services Conference Resolutions Manual
Recommended practice 1745 baggage information messages [3].
Especially Paragraph 2.2. in Section
"2-Data Dictionary"

of [3] contains a "quick reference index of information message elements" for data being part of the before mentioned data record Tij.
Paragraph
"2.3 detail specifications—data dictionary" of [3] defines in detail content and format for the content of a before mentioned tracking data record Tij.

In order to reduce complexity respectively the number of nodes in a blockchain K, it is preferred to aggregate the before mentioned tracking data records Tij in aggregated tracking data records $T_a$ij. The aggregation can be done by a common property of the data records Tij, as e.g.

Airline Code and Flight Number
Destination or Transfer Airport Code.

These examples are taken from section 2.3 of document [3]. Alternatively the aggregation can be made by another common property or by combining the before mentioned aggregation with a aggregation on a daily or bound to a working shift (e.g. 8 hours) and only one aggregated tracking data record is as tracking event pushed into the BlockChain network. The above mentioned aggregation has to be considered under the actual numbers of passengers respectively bag items. ICAO published in January 2018 the following figures: 2017: 4,1 billion passengers in Airline Industry. The number of bag items has to be estimated on the same magnitude. This number underlines the necessity for reducing the number of transactions to be pushed into a node of a blockchain.

It has to be noted, that the above-mentioned aggregation can be freely combined considering operational conditions and technical restrictions as e.g. the number of transactions.

Figure 3:
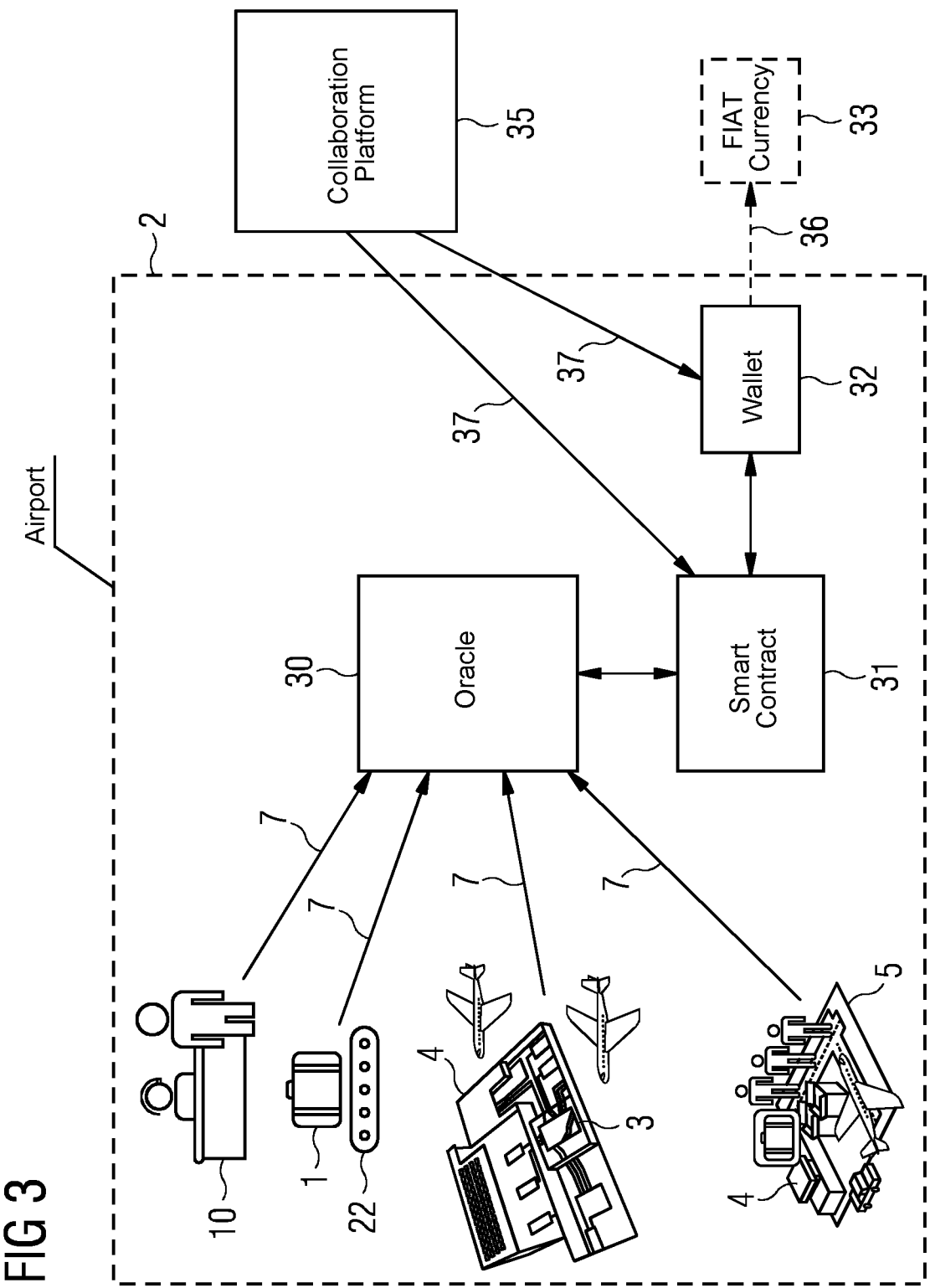
FIG. 3 Interworking structure of entities and components in Airline Industry for determining usage of tracking data for one airport.

Reference is made to FIG. 3. Whereas in FIG. 1 the BHS and BRS are shown only in a summary representation FIG. 3 shows BHS and BRS specifically.

The procedure BHS comprises e.g. baggage transportation within an airport, baggage screening and baggage sortation. The procedure BRS known as "baggage reconciliation system" attempts to ensure that the only baggage is loaded onto an aircraft that belongings to passengers of that flight who have actually boarded this aircraft.

Since a blockchain K is a decentralized, distributed ledger that is used to record transactions, there is a need for feeding data—in the terminology of blockchain technology «transcations» to a blockchain. This feeding (syn pushing) of «transactions» is done by a so-called Oracle 30. Reference is made to FIG. 3. FIG. 3 depicts an interworking structure of entities and components in Airline Industry for determining usage of tracking data records for one airport. According to a baggage journey as depicted in FIG. 1, all generated tracking data records Tij respectively $T_a$ij are sent as tracking events 7 via an oracle 30 to a dedicated blockchain K. More precisely: A data records Tij is received as a transaction by an oracle 30. The oracle 30 pushes said transaction into a node Ni of the blockchain K. The blockchain K itself is not depicted in FIG. 3, since technically decentralized. Each tracking event 7 respectively a transaction has a plurality of tracking sources, as e.g. BHS 3 at an airport 2, BRS 4 at an airport 2, aircraft loading/aircraft unloading 5 at an airport 2. In this context the before mentioned aggregation to aggregated tracking data records $T_a$ij of tracking data records Tij has to be understood.

Figure 2:
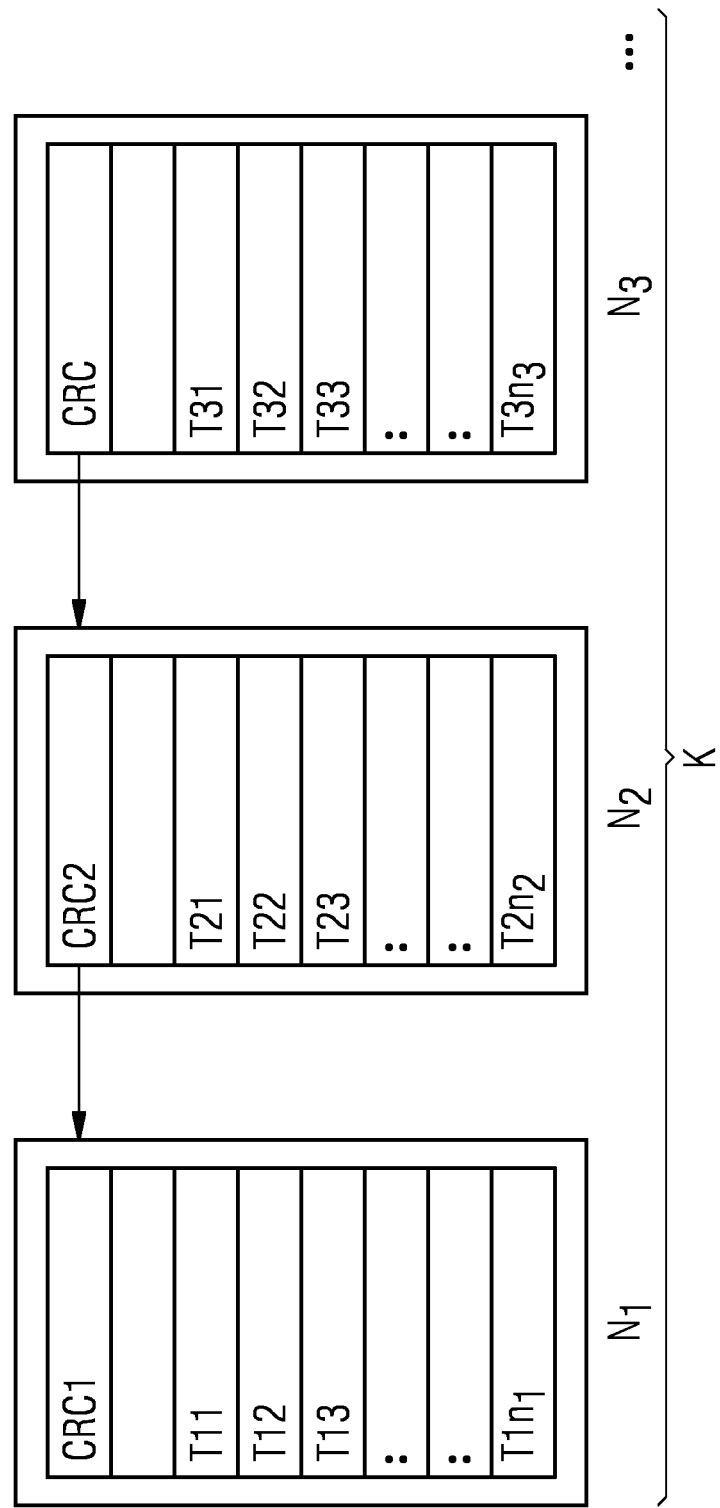
FIG. 2 Blockchain structure with nodes containing tracking data records.

Regarding the structure of the entries in a node $N_i$ reference is made to FIG. 2. For each node $N_i$ there is according to the blockchain technology a field CRC, which contains a hash value of the previous node $N_{i-1}$ of said blockchain K. This hash value can be generated e.g. via SHA-256 (Secure Hash Algorithm). FIG. 2 shows the principle, each entry respectively transaction has to be understood either by a data record Tij or by an aggregated data record $T_a$ij.

A usage of tracking data records (either single or aggregated) is determined by the following components of the blockchain technology. The oracle 30 interacts with a smart contract 31. Generally, a smart contract 31 is a computer protocol intended to digitally facilitate, verify, or enforce the negotiation or performance of a real contract. More specifically a smart contract is «a computerized transaction protocol that executes the terms of a contract». A blockchain-based smart contract is visible to all parties of said blockchain. Smart contracts allow the performance of credible transactions without external parties or authorities. These transactions are trackable and irreversible.

More precisely in the context of the present invention the oracle checks if a smart contract is available and if so the oracle pushes a new transaction into a node N1, . . . ) of the blockchain K.

In order to represent the aggregated results into the BlockChain network a special BlockChain component is required that is trusted by the network and which is also able to interface the devices producing the identification events and verify the information produces by them. Such components are called in the BlockChain technology oracles 30. Some smart contracts need information directly from the physical world, as e.g. in the environment of the present document: tracking data records of a bag item 1. The biggest challenge for oracles is the ability to report readings without sacrificing data security and data integrity.

In this particular environment of airports respectively in the field of Airline Industry there is an absolute prerequisite to guarantee data security and data integrity. For this reason, the oracle 30 is a so-called hardware oracle; further information can be found in the document [5].

For the present invention a smart contract 31 may be generated and provided on a blockchain K such that this smart contract 31 is configured to automatically validate blockchain transactions. This configuration causes a specific entry in a so-called wallet 32. An entry contains the information whether a party either adds a transaction which is in the meaning of the present invention a tracking data record Tij or an aggregated tracking data record $T_aij$ or whether a party takes a or more copies of said tracking data records Tij or an aggregated tracking data record $T_aij$ from the blockchain K.

Party has to be understood as in the introductory part mentioned as a specific organization in Airline Industry.

The accumulated usage of tracking data records is stored in this wallet 32. For the sake of completeness usage has to be understood either a delivery of tracking data records or taking a copy from a node Ti of said blockchain K. Taking a copy means e.g. that a passenger didn't get his baggage at the baggage claim. The passenger went to a lost luggage help desk, with the data (e.g. Ticket number, flight number, departing airport) provided by the passenger. The lost luggage help desk makes search via the tracked data records stored in said blockchain. This search is according to configuration of the smart contract 31 considered as a use and leads to a corresponding entry in the wallet 32. Periodically these entries in the wallet can be billed among the parties within this wallet. Another possibility is a conversion of usage 36 to a true currency, a so-called FIAT currency 33.

FIG. 3 depicts one airport 2, but FIG. 3 has to be understood for all airports participating at this method for a registration of usage of tracking data.

For the management and configuration of all these smart contracts 31 and wallets 32 a collaboration platform is provided, which configures the definitions of said smart contracts 31 and which may cause a billing among the partners according to the entries in the wallets 32 through operations management and control 37. Preferably this collaboration platform 35 is operated by an independent organisation in trust.

LIST OF REFERENCE SIGNS, GLOSSARY 1, 1' bag item
2 any airport
3 BHS at any airport
4 BRS at any airport
5 aircraft loading/aircraft unloading
7 tracking event
9 (currency) exchange
10 baggage drop, check-in
11 BHS at airport of departure A
12 baggage preparation; aircraft loading
13 aircraft take off at airport of departure A
14 aircraft landing at transfer airport B
15 aircraft unloading
16 BHS at transfer airport B
17 baggage preparation; aircraft loading
18 aircraft take off at transfer airport B
19 aircraft landing at Destination Airport C
20 aircraft unloading
21 BHS at Destination Airport C
22 baggage claim
30 oracle
31 smart contract
32 wallet
33 FIAT Currency
35 collaboration platform
36 Conversion usage→FIAT currency
37 operations management, control
A airport of departure
B transfer airport
BHS Baggage Handling System
BRS Baggage Reconciliation System
C destination airport
CAPEX capital expenditure
CRC hash sum
IATA International Air Transport Association
ICAO International Civil Aviation Organization
K Blockchain
$N_1, N_2, N_i$
Node, nodes of a Blockchain K
OPEX operational expenditure
SITA Société Internationale de Télécommunication Aéronautique
Tij $j^{th}$ tracking data record in node i;
Transaction

LIST OF CITED DOCUMENTS

[1] «Baggage Tracking IATA Resolution 753/A4A Resolution 30.53 Implementation Guide»
retrieved from http://www.iata.org via completing a form available under http://www.iata.org/whatwedo/ops-infra/baggage/Pages/index/aspx
[2] «Blockchain: The smart, secure and seamless future of air travel for all»
retrieved on Dec. 21, 2017 from https://www.internationalairportreview.com/article/34739/blockchain-sita-it-summit-2017/
[3] IATA
Passenger Services Conference Resolutions Manual RECOMMENDED PRACTICE 1745
BAGGAGE INFORMATION MESSAGES; 36 edition June 2016; available by purchasing at http://www.iata.org/publications/pages/standards-manuals.aspx
[4] IATA
Passenger Services Conference Resolutions Manual RECOMMENDED PRACTICE 1800
AUTOMATED BAGGAGE HANDLING BASED ON THE IATA LICENSEE PLATE; 36 edition June 2016;

available by purchasing at http://www.iata.org/publications/pages/standards-manauls.aspx

[5] What's a blockchain oracle? Information oracles & external data feeds; retrieved from https://blockchainhub.net/blockchain-oracles/ on Jan. 18, 2018.

The invention claimed is:

1. A computer implemented method for a registration of a usage of tracking data records, the method comprising:
    tracking bag items for transportation from an airport of departure to a destination airport at a plurality of points by using:
        data identifying a bag item,
        data identifying a point on which the bag item is tracked,
        data representing a time stamp of a passage of the bag item at a tracking point;
    storing an identity of the bag item, an identity of a tracking point and the data representing the time stamp of the passage of the bag item in a tracking data record;
    receiving the tracking data record as a transaction by an oracle, using the oracle to check an availability of a smart contract and upon the availability of the smart contract using the oracle to push the transaction into a node of a blockchain;
    determining the usage of the tracking data records by using the smart contract interacting with the oracle; and
    using the smart contract to generate a specific entry in a wallet, the entry representing the usage of the tracking data records.

2. The method according to claim 1, which further comprises pushing a plurality of tracking data records being an aggregated tracking data record as a transaction into a node of the blockchain, the tracking data records to be aggregated having a common property.

3. The method according to claim 2, which further comprises providing the common property of the tracking data records to be aggregated as at least one of:
    an airline code and flight number, or
    a destination airport code, or
    a transfer airport code, or
    a daily basis.

4. The method according to claim 1, which further comprises associating the blockchain with at least one of an airport code or calendar days.

5. The method according to claim 1, which further comprises configuring the smart contract by using a collaboration platform serving a plurality of airports.

6. The method according to claim 1, which further comprises tracking data records complying at least partly with a requirement of IATA recommendation 1745.

7. The method according to claim 1, which further comprises providing the oracle as a hardware oracle.

8. An installation at an airport, the installation comprising a computer for carrying out the steps of claim 1.

9. The method according to claim 1, wherein the oracle pushes the transaction into the node of the blockchain as a result of the check indicating that the smart contract is available.

* * * * *